United States Patent [19]

Kilts et al.

[11] 4,416,362

[45] Nov. 22, 1983

[54] MATERIAL DISCHARGE APPARATUS WITH IMPROVED DISCHARGE TUBE

[75] Inventors: Harold J. Kilts, Middleton; Laurence J. Swaziek, Madison, both of Wis.

[73] Assignee: Madison Farm Structures, Inc., Madison, Wis.

[21] Appl. No.: 288,946

[22] Filed: Jul. 31, 1981

[51] Int. Cl.³ ............................................. B65G 11/10
[52] U.S. Cl. .................................... 193/25 C; 52/195; 193/34
[58] Field of Search ................ 193/25 R, 25 C, 29, 193/34; 52/195; 406/114

[56] References Cited

U.S. PATENT DOCUMENTS

| 814,214 | 3/1906 | Johnson | 193/29 |
| 3,655,245 | 4/1972 | Schumacher | 302/59 |
| 3,699,732 | 10/1972 | Janssen et al. | 52/195 |
| 3,709,345 | 1/1973 | Price | 193/34 |
| 3,797,625 | 3/1974 | Price | 193/34 |

Primary Examiner—John J. Love
Assistant Examiner—Gene A. Church
Attorney, Agent, or Firm—Wood, Dalton, Phillips, Mason & Rowe

[57] ABSTRACT

In a silo chute is mounted a flexible tube that extends from above the uppermost silo doorway to the lower end of the chute and that has a continuous slit extending substantially from top to bottom on the side toward the silo doorways. A zipper permits the slit to be selectively opened from the top so the open discharge end of a transfer conduit which is mounted in an open silo doorway at any level may extend into the flexible tube to deliver into the tube material discharged from the silo.

10 Claims, 3 Drawing Figures

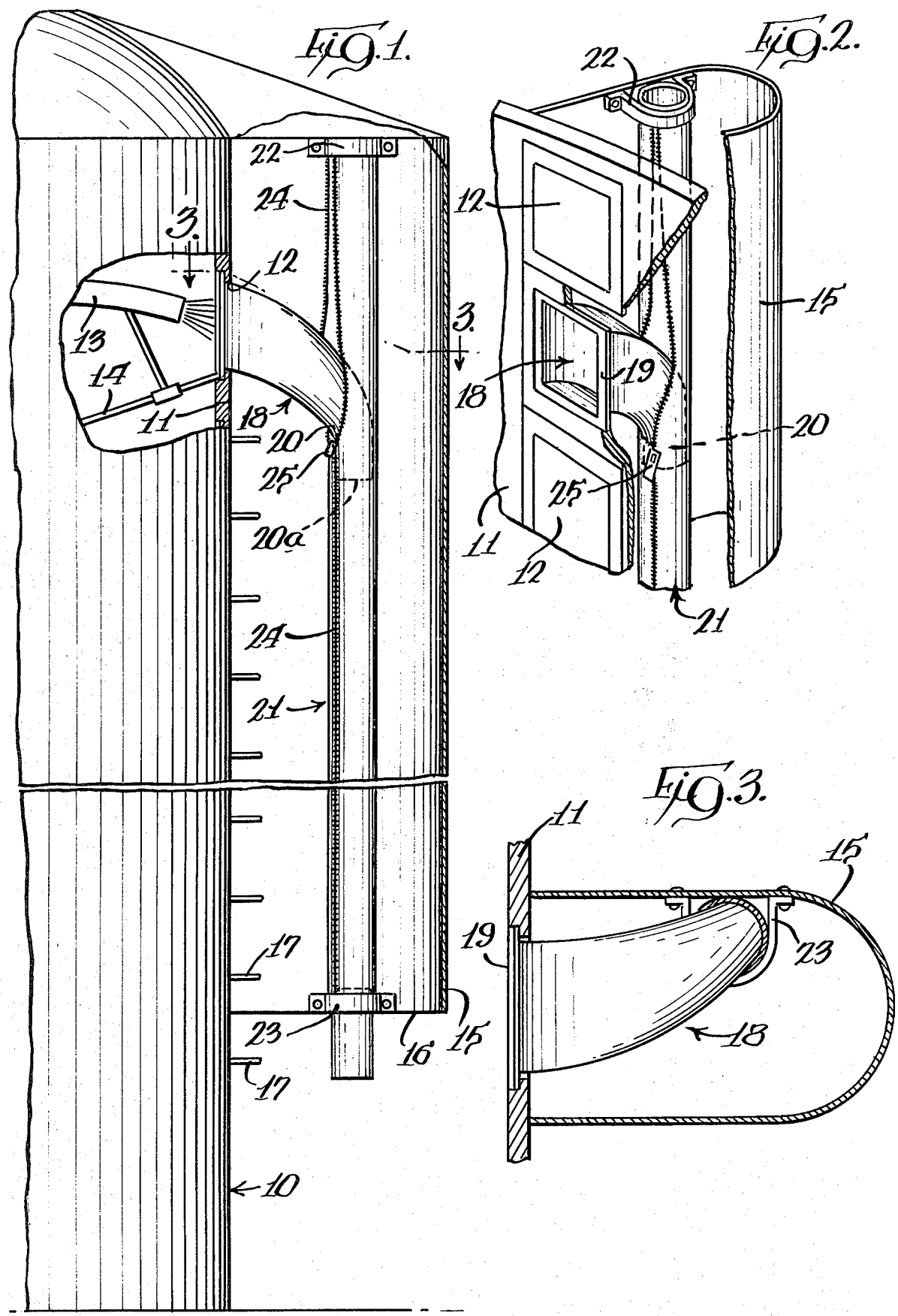

MATERIAL DISCHARGE APPARATUS WITH IMPROVED DISCHARGE TUBE

BACKGROUND OF THE INVENTION

During approximately the past ten years, four different arrangements have been devised of which applicants are aware for permitting silage to be discharged from a silo through the silo chute without dirtying the chute. U.S. Pat. No. 3,709,345 discloses a silo chute which has a vertical dividing wall which separates the interior of the chute into an access passage and a discharge passage. A transfer conduit conducts silage flung into it by a silo unloader across the access passage and into the discharge passage.

U.S. Pat. No. 3,655,245 discloses an arrangement in which an elongate flexible plastic tube is suspended from the end of the discharge chute of the silo unloader and hangs free in the vertical silo chute. As the silo unloader is lowered in the silo the lower end of the flexible plastic tube is cut off. This, then, requires that a new tube be provided each time the silo is refilled.

U.S. Pat. No. 3,699,732 discloses the use of a flexible plastic tube which is hung from the bottom of a transfer conduit and which is either accordion-folded from the bottom up or from the top down as the transfer conduit is lowered in the silo chute, or else which has a slit which may be opened from the bottom toward the top by a zipper to form an opening which may be kept always at approximately the bottom of the silo chute, with the excess tube material being rolled onto a reel outside the bottom of the chute.

U.S. Pat. No. 3,797,625 discloses an arrangement similar to that of 3,709,345 but having a separate rigid pipe in the silo chute instead of a partition dividing the chute.

SUMMARY OF THE INVENTION

The apparatus of the present invention utilizes a transfer conduit similar to those of the prior art. The invention utilizes an upright flexible tube which has a continuous upright slit extending substantially from top to bottom. First means secures the top of the flexible tube in the chute near the top of the uppermost silo doorway, while second means secures the bottom of the flexible tube in the chute near the bottom of the chute. The slit is closed by fastener means which may be selectively opened to admit the outer end portion of the transfer conduit to the flexible tube at any desired level while retaining the slit closed below the open end of the transfer conduit.

In a preferred embodiment of the invention the fastener means is a zipper which progressively opens the slit in the flexible tube as it moves from the top toward the bottom.

The present invention eliminates the need for cutting the lower end off a flexible tube and throwing it away as is required by the invention of U.S. Pat. No. 3,655,245.

The device is far less expensive than that of either of U.S. Pat. Nos. 3,709,345 and 3,797,625, each of which requires that either the partition or the rigid pipe, as the case may be, have a series of access openings operatively related to the silo doorways, and that each such opening have a removable closure. Some silage is quite dusty, and if the silo access chute is to be kept clean the closures must be extremely close-fitting.

In field tests of the apparatus of the present invention, it has been demonstrated that with the slit closed tightly around the open end of the transfer conduit by means of the zipper, almost completely dust-free discharge of dry silage may be accomplished.

The present invention also eliminates the need for either accordion folding or reeling up the excess flexible tube as required by U.S. Pat. No. 3,699,732.

BRIEF DESCRIPTION OF THE DRAWINGS

FIG. 1 is a fragmentary side elevational view of a silo and its access chute with the device of the present invention mounted therein;

FIG. 2 is a fragmentary perspective view, partly broken away, illustrating the silo wall, the access chute, and the upper part of the apparatus of the invention; and FIG. 3 is a fragmentary sectional view on an enlarged scale taken substantially as indicated along line 3—3 of FIG. 1.

DETAILED DESCRIPTION OF THE INVENTION

As seen in the drawings, a silo, indicated generally at 10, has a continuous side wall 11 which is provided with the customary vertical series of doorways 12, each of which is provided with a door that may be removed for discharging material from the silo. Customarily this is accomplished by using a top silo unloader, only the discharge conduit 13 and conduit securing bracket 14 of which are illustrated in FIG. 1. Surrounding the line of doorways 12 is a conventional silo access chute 15, the lower end 16 of which is a short distance above the bottom of the silo 10, and which serves to protect from weather both the silo doorways 12 and the rungs 17 of a ladder which a person must use to ascend the exterior of the silo when it becomes necessary to open a difficult silo doorway and move the silo unloader.

In common with prior art apparatus, the present invention utilizes a transfer conduit, indicated generally at 18, which has a rectangular open inner end provided with an external flange 19 that frames an open silo doorway and lies against the inner surface of the silo wall 11. The transfer conduit 18 has an outer end portion 20 which is cylindrical and has an open outer end 20a, and which is adapted to cooperate with the upright flexible tube of the present invention.

Turning now to the novel structure of the present apparatus, a flexible tube, indicated generally at 21, is fixedly secured to the interior of the silo access chute 15 by means consisting of an upper bracket collar 22 which is above the uppermost doorway 12 in the silo wall and a lower bracket collar 23 which is at the bottom of the chute. As seen in FIGS. 2 and 3, the flexible tube 21 is mounted to one side of the doorways 12.

A slit 24 extends from end to end of the flexible tube 21 on the side toward the silo doorways 12, and fastener means in the form of a zipper 25 which closes the slit 24 permits it to be opened from the top down to admit the end portion 20 of the transfer conduit 18 to the flexible tube 21 at any desired level while retaining the slit 24 closed below said end portion. As best seen in FIG. 2, after the end portion 20 of the transfer conduit 18 is inserted into the flexible tube 21, the slide member of the zipper 25 may be moved close against the lower side of the transfer conduit to make a substantially dust-free connection. Preferably the flexible tube 21 is fabricated from a material that may stretch slightly, so that it closely embraces the outer end portion 20 when the zipper is moved up against the transfer conduit 18.

When the level of material in a silo has been lowered sufficiently by operation of the silo unloader that it is necessary to move to the next lower doorway 12, it is only necessary to move the slide member of the zipper 25 down a sufficient distance that when the transfer conduit is relocated in the next lower doorway 12 its end portion 20 may be inserted in the flexible tube, after which the slide member of the zipper 25 is moved up and fits snugly against the transfer conduit 18.

The foregoing detailed description is given for clearness of understanding only and no unnecessary limitations should be understood therefrom, as modificatons will be obvious to those skilled in the art.

We claim:

1. In apparatus for delivering material from a mass of material stored in a silo which has a vertical series of doorways, said material being removed from the top of the mass and discharged through the one of said series of doorways which is nearest above the top of the mass into a chute on the silo, which apparatus includes a transfer conduit adapted to be mounted in said one of said series of doorways to receive discharged material and having an outer end portion with an open end to direct said material into a tube through which it is delivered to the lower end of the chute, the improvement comprising:

an upright flexible tube which is open at the bottom and has a continuous upright slit extending substantially from top to bottom thereof;

first means fixedly securing the top of said flexible tube in the chute near the top of the uppermost silo doorway;

second means fixedly securing the bottom of said flexible tube in the chute near the bottom of the chute; and fastener means which closes said slit and which may be selectively opened to admit the open end of the transfer conduit to the flexible tube at any desired level while retaining said slit closed below said open end whereby the transfer conduit may be mounted in any one of said series of doorways and direct material into the tube at said desired level while the entire tube remains fixedly secured in the chute.

2. The improvement of claim 1 in which the slit is on the side of the flexible tube toward the silo doorways.

3. The improvement of claim 1 in which the flexible tube is fabricated from a material that may stretch slightly so as to closely embrace the outer end portion of the transfer conduit.

4. The improvement of claim 1 in which the first and second means are brackets secured to the chute.

5. The improvement of claim 4 in which the brackets are collars surrounding the tube.

6. The improvement of claim 2 in which the tube is positioned against the chute to one side of the silo doorways.

7. The improvement of claim 1 in which the tube is positioned against the chute to one side of the silo doorways.

8. The improvement of claim 1 in which the fastener means is a zipper which opens the slit as it moves from the top toward the bottom.

9. The improvement of claim 2 in which the fastener means is a zipper which opens the slit as it moves from the top toward the bottom.

10. The improvement of claim 3 in which the fastener means is a zipper which opens the slit as it moves from the top toward the bottom.

* * * * *